(12) United States Patent
Lui

(10) Patent No.: US 7,533,205 B2
(45) Date of Patent: May 12, 2009

(54) CONTROL METHOD AND SYSTEM OF CONSTRUCTING RAID CONFIGURATION ACROSS MULTIPLE HOST BUS ADAPTERS

(75) Inventor: Chih-Hao Lui, Taipei (TW)

(73) Assignee: Via Technologies, Inc., Taipei (TW)

( * ) Notice: Subject to any disclaimer, the term of this patent is extended or adjusted under 35 U.S.C. 154(b) by 173 days.

(21) Appl. No.: 11/747,696

(22) Filed: May 11, 2007

(65) Prior Publication Data

US 2008/0059670 A1    Mar. 6, 2008

(30) Foreign Application Priority Data

Sep. 1, 2006    (TW) .............................. 95132450 A

(51) Int. Cl.
*G06F 13/36* (2006.01)

(52) U.S. Cl. ..................................... 710/110
(58) Field of Classification Search ................. 710/110
See application file for complete search history.

(56) References Cited

U.S. PATENT DOCUMENTS

| | | | | |
|---|---|---|---|---|
| 5,768,623 A | * | 6/1998 | Judd et al. ..................... | 710/37 |
| 5,774,680 A | * | 6/1998 | Wanner et al. ............... | 710/110 |
| 6,173,374 B1 | * | 1/2001 | Heil et al. ..................... | 711/148 |
| 6,185,639 B1 | * | 2/2001 | Kailash et al. ................. | 710/48 |
| 6,282,584 B1 | * | 8/2001 | Garroussi et al. .............. | 710/5 |
| 6,654,831 B1 | * | 11/2003 | Otterness et al. .............. | 710/74 |
| 6,684,274 B1 | * | 1/2004 | Chong, Jr. ..................... | 710/56 |
| 6,757,753 B1 | * | 6/2004 | DeKoning et al. ............ | 710/38 |
| 6,996,741 B1 | * | 2/2006 | Pittelkow et al. ............... | 714/5 |
| 7,111,084 B2 | * | 9/2006 | Tan et al. ...................... | 710/15 |
| 7,424,529 B2 | * | 9/2008 | Hubis .......................... | 709/224 |
| 2004/0177218 A1 | * | 9/2004 | Meehan et al. ............... | 711/114 |

\* cited by examiner

*Primary Examiner*—Paul R Myers
(74) *Attorney, Agent, or Firm*—Rosenberg, Klein & Lee

(57) ABSTRACT

A control method of constructing a RAID configuration across multiple host bus adapters in a data-processing system includes the following steps. Firstly, a master host bus adapter and at least a first slave host bus adapter are defined among the plurality of host bus adapters. After the data-processing system is initialized, a query signal is asserted. Then, a first channel number of the master host bus adapter is responded to the query signal, wherein the first channel number at least includes a real channel number of the master host bus adapter and a channel number of the first slave host bus adapter. Afterwards, a RAID configuration across at least the master host bus adapter and the first slave host bus adapter is constructed.

20 Claims, 3 Drawing Sheets

CONTROL METHOD AND SYSTEM OF CONSTRUCTING RAID CONFIGURATION ACROSS MULTIPLE HOST BUS ADAPTERS

FIELD OF THE INVENTION

The present invention relates to a control method and a control system, and more particularly to a control method and a control system of constructing a RAID (Redundant Array of Inexpensive Disk) configuration across multiple host bus adapters.

BACKGROUND OF THE INVENTION

Due to the amazing power of computers, computers are widely used to implement diversified tasks such as data processing tasks, amusement-related tasks or communication tasks. With the increasing development of digitalized generation, the data storage density for the conventional data storage media might become unsatisfactory soon for receiving and storing a great amount of data. For dealing with such a problem, a single data storage medium with a very large quantity of storage capacity or a plurality of data storage media are used in a computer system. Conventionally, data stored in a data storage medium are read via a disk drive that is operated mechanically. Therefore, the operating speed of the disk drive likely fails to catch up with the high processing speed of the central processing unit (CPU). For matching the operating speed of the disk drive and the processing speed of the central processing unit, a configuration of RAID (Redundant Array of Inexpensive Disk) is proposed. In the RAID configuration, multiple disk drives are used to store the same data in order to increase the data transfer rate and data safety. In a case that one of the multiple disk drives has a breakdown, the lost data can be restored according to an interactive encoding technology among the disk drives.

Typically, the disk drives communicate with the computer system via a host bus adapter (HBA). Since one host bus adapter can only link thereto a limited amount of disk drives, two or more host bus adapters are required for serving a larger amount of disk drives. All host bus adapters are electrically connected to a miniport driver stack layer, which serves as a small computer standard interface (SCSI) between the disk drives which link to the host bus adapters and the computer system. Since the operations of these host bus adapters are independent from each other, the disk drives can only be driven by the host bus adapters linking thereto. If any of the host bus adapters has a breakdown, the disk drives which link to the damaged host bus adapter cannot participate in the RAID configuration, so the performance of the RAID configuration is largely reduced. For example, if one host bus adapter has been idle for a long time and enters a sleeping mode, other host bus adapters might have problems in synchronization.

SUMMARY OF THE INVENTION

The present invention provides a control method and a control system of constructing a RAID configuration across multiple host bus adapters.

In accordance with an aspect of the present invention, there is provided a control method of constructing a RAID configuration across multiple host bus adapters in a data-processing system. Firstly, a master host bus adapter and at least a first slave host bus adapter are defined among the plurality of host bus adapters. After the data-processing system is initialized, a query signal is asserted. Then, a first channel number of the master host bus adapter is responded to the query signal, wherein the first channel number at least includes a real channel number of the master host bus adapter and a channel number of the first slave host bus adapter. Afterwards, a RAID configuration across at least the master host bus adapter and the first slave host bus adapter is constructed.

In accordance with another aspect of the present invention, there is provided a control system of constructing a RAID configuration across multiple host bus adapters in a data-processing system. The data-processing system including a plurality of host bus adapters. The control system includes a host bus adapter level and a channel level. The host bus adapter level includes a plurality of host bus adapter physical device objects and a plurality of host bus adapter functional device objects respectively corresponding to the plurality of host bus adapters. The channel level includes a plurality of channel physical device objects and a plurality of channel functional device objects respectively corresponding to the plurality of host bus adapters and coupled to the same one of the host bus adapter functional device objects in the host bus adapter level.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
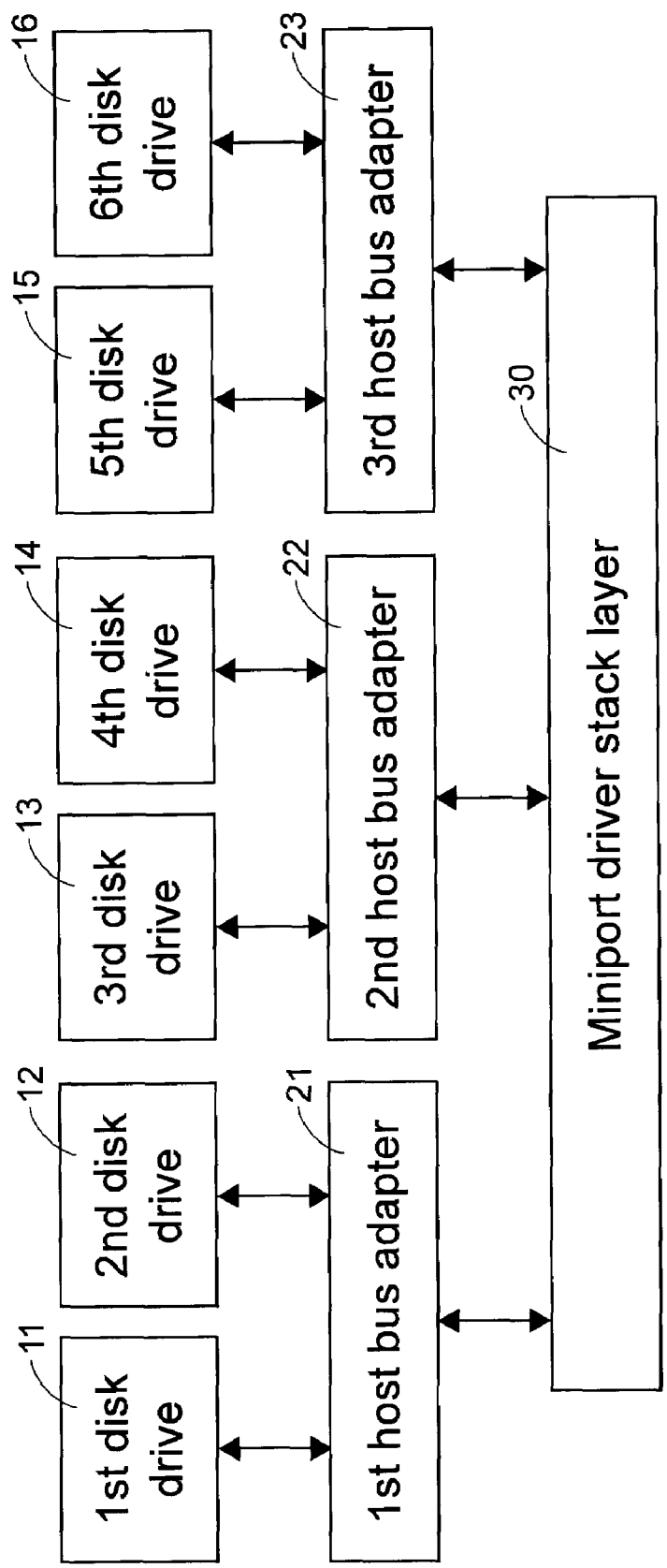
FIG. 1 is a schematic block diagram illustrating a computer system having six disk drives.

Please refer to FIG. 1, which is a schematic block diagram illustrating a data-processing system, e.g. a computer system, having six data storage media, e.g. disk drives. The computer system of FIG. 1 includes a miniport driver stack layer 30, three host bus adapters (HBAs) 21, 23, 25 and six disk drives 11~16. The first disk drive 11 and the second disk drive 12 are electrically connected to the first host bus adapter 21. The third disk drive 13 and the fourth disk drive 14 are electrically connected to the second host bus adapter 23. The third disk drive 15 and the fourth disk drive 16 are electrically connected to the third host bus adapter 25. The first host bus adapter 21, the second host bus adapter 23 and the third host bus adapter 25 are electrically connected to the miniport driver stack layer 30. The miniport driver stack layer 30 serves as a small computer standard interface (SCSI) between the disk drives 11~16 and other parts of the computer system. As previously described, since the operations of these host bus adapters are independent from each other, the disk drives can only be driven by the host bus adapters linking thereto. If any of the host bus adapters has a breakdown, the disk drives which link to the damaged host bus adapter cannot participate in the RAID configuration, so the performance of the RAID configuration is largely reduced.

Figure 2:
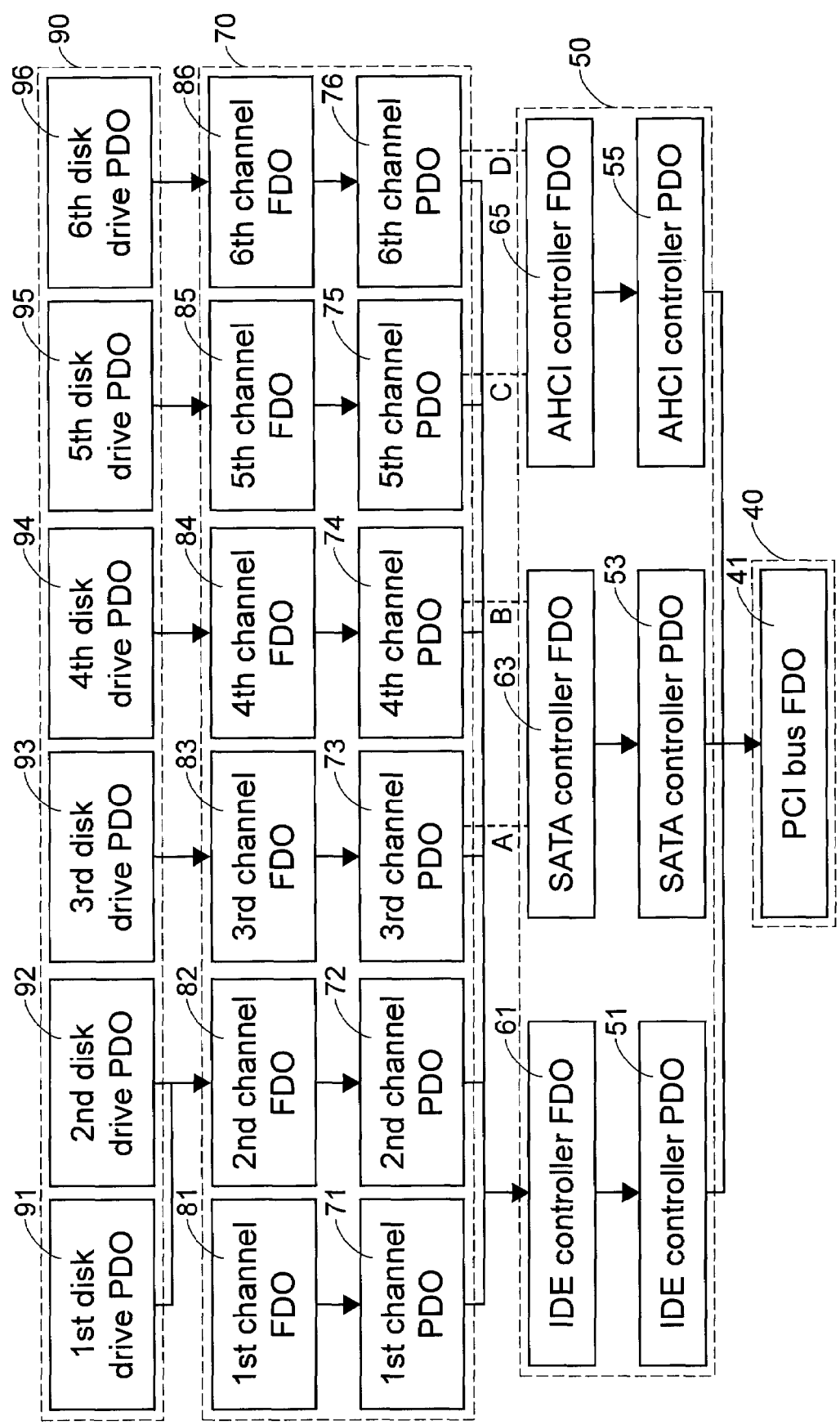
FIG. 2 is a schematic block diagram illustrating a control system of constructing a RAID configuration across multiple host bus adapters according to an embodiment of the present invention.

Please refer to FIG. 2, which is a schematic block diagram illustrating a control system of constructing a RAID configuration across multiple host bus adapters according to an embodiment of the present invention. The control system is constructed as a multi-layer hierarchy. The multi-layer hierarchy includes a bus level 40, a host bus adapter level 50, a channel level 70 and a disk drive level 90. When the computer system is initiated, the operating system creates a bus functional device object (FDO) according to a host bus of the computer system. Via this host bus, the host bus adapters 21, 23, 25 shown in FIG. 1 communicate with other parts in the computer system. For example, the host bus can be a PCI (Peripheral Controller Interconnect) bus, and thus the bus level 40 is a PCI bus level and the bus functional device object 41 resulting from the operating system is a PCI bus functional device object.

Subsequently, according to the linking state of the host bus adapters to the PCI bus, corresponding host bus adapter physical device objects (PDOs) in the host bus adapter level 50 are created. In a case that the host bus adapters 21, 23, 25 are respectively IDE (Integrated Drive Electronics) controller, SATA (Serial advanced Technology Attachment) controller and AHCI (Advanced Host Controller Interface) controller, an IDE controller physical device object 51, a SATA controller physical device object 53 and an AHCI controller 55 are then created.

As known, each functional device object corresponds to a physical device object, and vice versa. In other words, functional device objects and the physical device objects are correspondingly created. Accordingly, after the IDE controller physical device object 51, the SATA controller physical device object 53 and the AHCI controller physical device object 55 are created, an IDE controller functional device object 61, a SATA controller functional device object 63 and an AHCI controller functional device object 65 are correspondingly created. These controller physical device objects 51, 53 and 55 link to the controller functional device objects 61, 63 and 65, respectively. The controller physical device objects 51, 53, 55 and the controller functional device objects 61, 63, 65 are all included in the host bus adapter level 50. Since the controller physical device objects 51, 53, 55 are coupled to the PCI bus functional device object 41, the host bus adapter level 50 is coupled to the bus level 40.

Subsequently, corresponding to the channels included in the host bus adapters 21, 23 and 25, respective channel physical device objects of the channel level 70 are created. For example, the host bus adapter 21 has two channels, and a first channel physical device object 71 and a second channel physical device object 72 are then created; the host bus adapter 23 has two channels, and a third channel physical device object 73 and a fourth channel physical device object 74 are then created; and the host bus adapter 25 has two channels, and a fifth channel physical device object 75 and a sixth channel physical device object 76 are then created. Just like the controller functional device objects and the controller physical device objects are correspondingly created, after the channel physical device objects 71~76 are created, six channel functional device objects 81~86 are respectively created. These channel physical device objects 71~76 link to the channel functional device objects 81~86, respectively. The channel physical device objects 71~76 and the channel functional device objects 81~86 are all included in the channel level 70. Since the channel physical device objects 71~76 are coupled to the IDE controller functional device object 61, the channel level 70 is coupled to the host bus adapter level 50.

Afterwards, corresponding to the disk drives 11~16 linking to the host bus adapters 21, 23 and 25, respective disk drive physical device objects 91~96 of the disk drive level 90 are created. Likewise, after the disk drive physical device objects 91~96 are created, six disk drive functional device objects are correspondingly created. For simplification, the disk drive functional device objects are not illustrated in the drawings.

Therefore, in the above embodiment illustrated with reference to FIG. 2, the first layer of the multi-layer hierarchy of the control system is a bus level 40 including the bus functional device object 41. The second layer is a host bus adapter level 50 including the same number of controller physical device objects and controller functional device objects as the number of the host bus adapters linking to the PCI bus. The third layer is a channel level 70 including the same number of channel physical device objects and channel functional device objects as the number of the channels contained in the host bus adapters. The fourth layer is the disk drive level including the same number of disk drive physical device objects as the disk drives linking to the host bus adapters.

For operation, the PCI devices linking to the PCI bus have respective PCI addresses. The PCI addresses include a bus code for identifying which bus is directed to and a device code for identifying which device is directed to. The topological architecture of the PCI bus configuration is defined by the operating system when the computer system is initialized. Among the PCI devices linking to the PCI bus, the PCI device having the highest numbered PCI address is defined by the operating system as a master PCI device and the other host bus adapters are defined as slave PCI device. Optionally, the order of the slave PCI devices may be determined according to the PCI addresses. After the computer system is initialized, the operating system asserts a bus configuration cycle to identify whether any PCI device is linking thereto by searching the PCI addresses from the lowest to the highest. The PCI device having the highest numbered PCI address is defined as a master PCI device and annexed with a master label. Whereas, the other slave PCI devices are annexed with slave labels. While scanning the PCI addresses, the operating system asserts a query signal to realize how many channels are included in each host bus adapter at each address. In the prior art, since the operations of these host bus adapters are independent from one another, the master host bus adapter and the slave host bus adapters respond to the operating system with respective channel numbers. According to the present invention, on the other hand, the slave host bus adapters, when being scanned, respond to the operating system with a channel number of zero while additionally recording the real channel number. On the other hand, the master host bus adapter, when being scanned, responds to the operating system with a channel number of the sum of all recorded channel numbers including the channels of the master host bus adapter itself. Under this circumstance, what the operating system recognizes is that all disk drives link to the single master host bus adapter, thereby constructing a RAID configuration across multiple host bus adapters.

Alternatively, there can be partial slave host bus adapters responding to the operating system with a zero channel number while the other slave host bus adapters respond to the operating system with respective real channel numbers. As a result, a RAID configuration across multiple host bus adapters and another RAID configuration of independent host bus adapters are simultaneously present so as to support alternative applications. In this embodiment, the slave host bus adapters which are coupled to the master host bus adapter in the RAID configuration across multiple host bus adapters are annexed with subordinate labels identifiable by the operating system during the scanning operation. Whereas, no subordinate labels are added to the slave host bus adapters in the RAID configuration of independent host bus adapters. Accordingly, the operating system of the computer can identify or classify the host bus adapters according to the presence or absence of the subordinate labels.

Please refer to FIG. 2 again. For example, the first host bus adapter 21 is the master host bus adapter and the second host bus adapter 23 and third host bus adapter 25 are slave host bus adapters. In response to the query signal asserted by the operating system, the first host bus adapter 21 responds that six channels are contained therein and the second host bus adapter 23 and third host bus adapter 25 respond that no channel is contained therein. Accordingly, the architecture of the control system of the present invention is indicated by the solid line as shown in FIG. 2. That is, the channel physical device objects 71~76 are all directed to the IDE controller functional device object 61. In contrast, the conventional architecture of the control system is indicated by the dotted lines A, B, C and D as shown in FIG. 2. That is, in the conventional architecture, the channel physical device objects 71 and 72 are directed to the IDE controller functional device object 61, the channel physical device objects 73 and 74 are directed to SATA controller functional device object 63, and the channel physical device objects 75 and 76 are directed to the AHCI controller functional device object 65.

Figure 3:
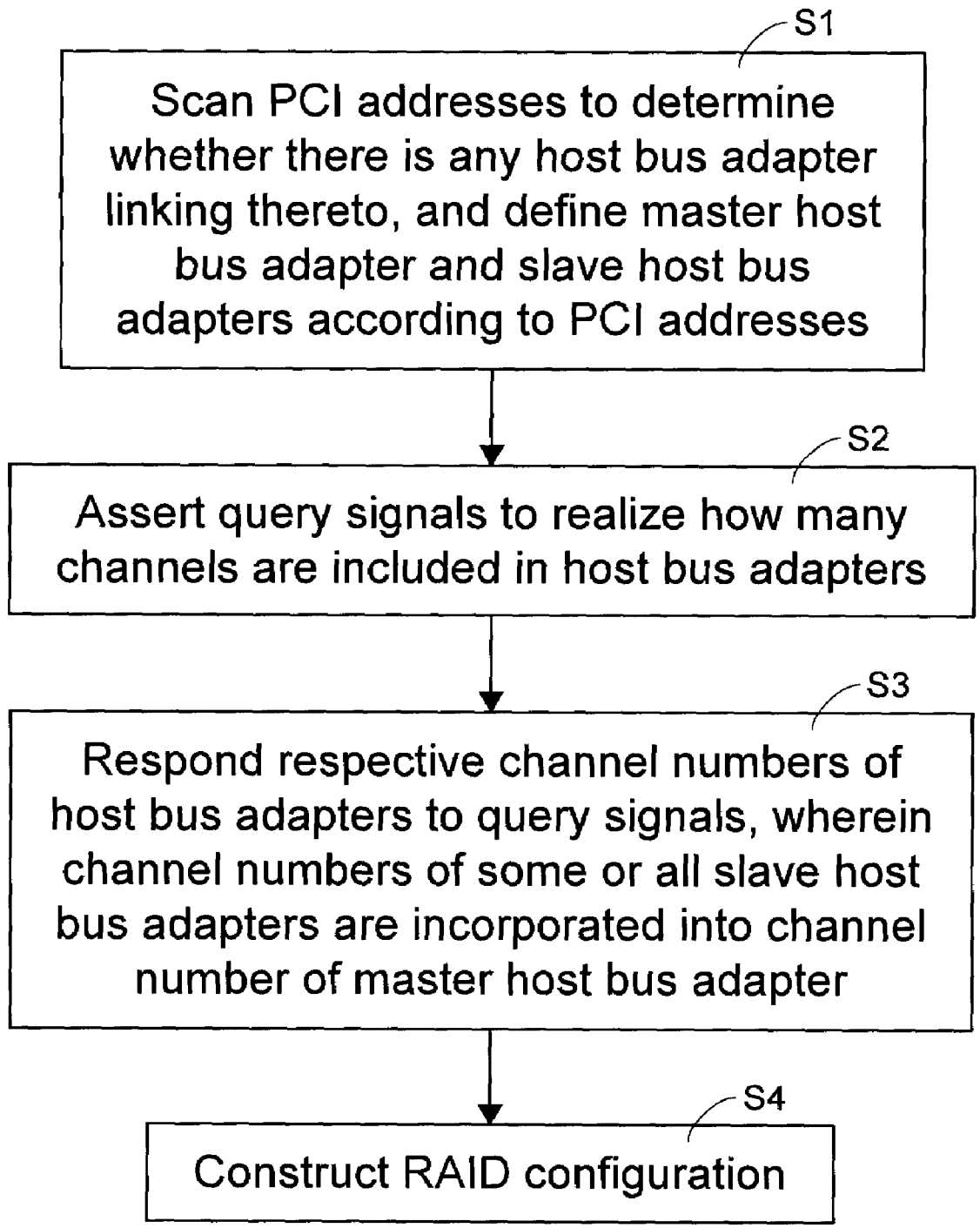
FIG. 3 is a flowchart illustrating a control method of constructing a RAID configuration across multiple host bus adapters according to an embodiment of the present invention.

Hereinafter, a control method of constructing a RAID configuration across multiple host bus adapters will be illustrated with reference to the flowchart FIG. 3 and also the architecture of FIG. 1. First of all, when the computer system is initialized, the operating system searches for the PCI addresses from the lowest to the highest to identify whether any PCI device is linking thereto (Step S1). Meanwhile, the host bus adapter having the highest numbered PCI address is defined as a master host bus adapter and annexed with a master label, and the other host bus adapters are defined as slave host bus adapters and annexed with slave labels. The order of the slave host bus adapters may be further determined according to their PCI addresses. Then, the operating system asserts a query signal to each host bus adapters to realize how many channels are included in these host bus adapters (Step S2). For example, if the first host bus adapter 21 is the master host bus adapter and the second host bus adapter 23 and third host bus adapter 25 are slave host bus adapters, the first host bus adapter 21 is annexed with a master label and the second host bus adapter 23 and third host bus adapter 25 are annexed with slave labels.

In response to the query signal, the master host bus adapter responds to the operating system with a channel number including channel numbers of one or more slave host bus adapters (Step S3). For example, the channels contained in all host bus adapters are counted as the channel number of the master host bus adapter while each of the slave host bus adapters responds to the operating system with zero channel number. Accordingly, the operating system recognizes that all disk drives are linking to a single host bus adapter, i.e. the master host bus adapter. Nevertheless, the real channel numbers of the slave host bus adapters are additionally recorded.

Afterwards, the operating system constructs a RAID configuration across multiple host bus adapters based on the above channel arrangement (Step S4). That is, exemplified with the architecture of FIG. 2, the channel physical device objects 71~76 are all directed to the IDE controller functional device object 61.

Optionally, some slave host bus adapters may be reserved to respond to the operating system with their own channel numbers so that no subordinate labels are coupled to such slave host bus adapters. Meanwhile, the channel number responded by the master host bus adapter excludes the channel number of these slave host bus adapters. In this way, a RAID configuration across multiple host bus adapters and a RAID configuration of independent host bus adapters can both be patterned.

From the above description, the control method and system of the present invention is capable of constructing a RAID configuration across multiple host bus adapters by virtually coupling channels of other host bus adapters to the master host bus adapter. When the master host bus adapter has a breakdown, the slave host bus adapter having the second highest numbered PCI address will serve as a new master host bus adapter. Accordingly, the data transfer rate, the data safety and the performance of the RAID configuration can be enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of constructing a RAID configuration across multiple host bus adapters in a data-processing system, the data-processing system including a plurality of host bus adapters, the control method comprising steps of:
   defining a master host bus adapter and at least a first slave host bus adapter among the plurality of host bus adapters;
   asserting a query signal after the data-processing system is initialized;
   responding to the query signal with a first channel number of the master host bus adapter, wherein the first channel number at least includes a real channel number of the master host bus adapter and a channel number of the first slave host bus adapter; and
   constructing a RAID configuration across at least the master host bus adapter and the first slave host bus adapter.

2. The control method according to claim 1 wherein the master host bus adapter has the highest number of bus address, and the other host bus adapters are designated as slave host bus adapters with sequentially reduced numbers of bus addresses.

3. The control method according to claim 2 further comprising a step of annexing a master label to the master host bus adapter and slave labels to the slave host bus adapters.

4. The control method according to claim 1 further comprising a step of annexing a subordinate label to the first slave host bus adapter.

5. The control method according to claim 4 wherein the first channel number includes summed channel numbers of the plurality of host bus adapters.

6. The control method according to claim 5 wherein all the plurality of host bus adapters except the master host bus adapter are annexed with subordinate labels.

7. The control method according to claim 5 wherein the RAID configuration is constructed across all the plurality of host bus adapters.

8. The control method according to claim 4 wherein the first channel number excludes a channel number of a third slave host bus adapter defined among the plurality of host bus adapters, and the third slave host bus adapter is exempted from being annexed with the subordinate label.

9. The control method according to claim 8 further comprising a step of constructing another RAID configuration of the third slave host bus adapter.

10. The control method according to claim 1 further comprising a step of recording respective real channel numbers of the plurality of host bus adapters.

11. The control method according to claim 1 wherein the data-processing system is a computer system and the query signal is asserted by an operating system of the computer system.

12. A control system of constructing a RAID configuration across multiple host bus adapters in a data-processing system, the data-processing system including a plurality of host bus adapters, the control system comprising:
  a host bus adapter level including a plurality of host bus adapter physical device objects and a plurality of host bus adapter functional device objects respectively corresponding to the plurality of host bus adapters; and
  a channel level including a plurality of channel physical device objects and a plurality of channel functional device objects respectively corresponding to the plurality of host bus adapters and coupled to the same one of the host bus adapter functional device objects in the host bus adapter level.

13. The control system according to claim 12 further comprising a bus level including a bus functional device object corresponding to a host bus of the data-processing system, wherein the host bus adapter level is coupled to the bus level.

14. The control system according to claim 13 wherein the host bus of the computer is a PCI bus, and the bus functional device object is a PCI bus functional device object.

15. The control system according to claim 12 further comprising a disk drive level coupled to the channel level, which includes a plurality of disk drive physical device objects and disk drive functional device objects respectively corresponding to the disk drives linking to the host bus adapters.

16. The control system according to claim 12 wherein the plurality of host bus adapters include a master host bus adapter with the highest numbered bus address and at least one slave bus adapter with a lower numbered bus address.

17. The control system according to claim 16 wherein the same one of the host bus adapter functional device objects where the plurality of channel physical device objects and the plurality of channel functional device objects are coupled is a host bus adapter functional device object corresponding to the master host bus adapter.

18. The control system according to claim 17 wherein the master host bus adapter is an IDE (Integrated Drive Electronics) controller.

19. The control system according to claim 17 wherein the master host bus adapter is a SATA (Serial advanced Technology Attachment) controller.

20. The control system according to claim 17 wherein the master host bus adapter is an AHCI (Advanced Host Controller Interface) controller.

* * * * *